Patented May 29, 1928.

1,671,572

UNITED STATES PATENT OFFICE.

CLARENCE LEON DELACHAUX, OF GENNEVILLIERS, FRANCE.

HARD-ALLOY-STEEL PROCESS.

No Drawing. Application filed December 8, 1924, Serial No. 754,664, and in France December 8, 1923.

In many cases hard alloy steel is of the greatest utility, for instance in rock drilling or dredging. Its chief use is however in track apparatus for railways and street car lines, for which manganese steel is especially adapted. Unfortunately it cannot up to date be put into general use, because of the difficulties met with in manufacture owing to the great difficulty of casting steel containing a high percentage of manganese and obtaining thereby faultless parts.

On the other hand, it is rather easy to cast regular sectional shapes, pieces or elements made of such steel, for instance an ordinary rail; it can even be produced by rolling if short lengths (from 3 to 5 m.) are sufficient for requirements. Thus faultless rolling surfaces can be produced without any flaws or cracks in the middle, which ensure a long working life to apparatus.

The object of my invention is the making of parts of track structure and apparatus, such as switches, points, crossings or frogs of hard alloy steel, for instance steel with a high percentage of manganese. For this purpose, standard rails produced easily by casting or rolling said steel as aforesaid are united by aluminothermic welding.

It is necessary that a welding should be made which does not render rail joint brittle; there arises thereby a difficulty in the welding and a practical impossibility of using the aluminothermic reaction generally used for welding ordinary rails.

I have found this brittleness can be avoided by using a special aluminothermic mixture which varies according to circumstances and chiefly according to percentage of manganese in the steel used.

Thus for instance for welding together manganese rails in which percentage of manganese is 12%, good results are produced if the following aluminothermic mixture is used.

| | Per cent. |
|---|---|
| Iron oxide | 69,5 |
| Sequioxide of manganese | 3 |
| Aluminum | 18 |
| Ferromanganese (75%) with an addition of 6% carbon | 9 |
| Ferrosilicon (80%) | 0,5 |

The above composition given only as an example, may be varied by changing sequioxide of manganese $Mn^2O^3$ into manganous-manganic oxide ($Mn^3O^4$) or an intermediate oxide. If the reaction gives too much heat, it can be improved by changing partly manganese oxides into metallic manganese or into high grade ferromanganese. In such a case, a proportion of aluminum should be eliminated according to the proportion of oxide replaced.

The reaction takes place in a magnesia crucible and the casting is made in a refractory mould prepared beforehand round the rails to be welded, as usual. As soon as the welding begins to get solid, the discharging begins and when suitable temperature is reached, the usual thermic treatment of manganese steel is provided for.

This process can be combined with a previous heating of parts in the mould, whereby an economy of aluminothermic mixture is obtained and the casting operation is easier.

When hard steel alloys are to be welded with ordinary steel, for instance at joints between apparatus in manganese steel and rest of track, there arises a difficulty in the fact that by welding one steel part with for example 0,80 to 1,25% manganese and a part containing 10 to 14% of same, there is necessarily a point where the exceptionally brittle alloy containing 4% of manganese is to be found.

To avoid this brittle zone, the welding should be made with an aluminothermic mixture producing a steel alloy which mixing with the ordinary steel and manganese steel melted together by the aluminothermic reaction, produces a non-brittle alloy which gives in every section required strength without any brittleness. For instance a mixture can be used using an alloy containing 18% to 20% nickel which produces a manganese-nickel alloy meeting perfectly above mentioned requirements.

My process, therefore, provides for the making of track parts and apparatus for railways and street car lines such as switches, frogs, crossings and the like, by using rolled or cast rails made out of hard steel alloys (steel containing a high percentage of manganese or metals such as zirconium, molybdenum, titanium, chromium, vanadium or alloys thereof.

The above mentioned aluminothermic mixtures are intended for welding steel with a high percentage of manganese or for joining such steel with ordinary steel.

Evidently according to circumstances, the manganese oxide can be replaced by suitable zirconium, molybdenum, or similar refractory oxides.

The process has the advantage of using only parts involving ordinary sections easy to roll or to cast which are thereby faultless. Out of these the most intricate devices can be built without any costly patterns which are difficult to make and which one is obliged to use when said devices are made in cast steel.

What I claim is:

1. The method of joining manganese steel to ordinary carbon steel, which comprises welding the parts by the reaction of an alumino-thermic mixture containing a relatively high percentage of nickel.

2. The method of joining manganese steel to ordinary carbon steel, which comprises welding the parts by the reaction of an alumino-thermic mixture containing from 18% to 20% of nickel.

In witness whereof I have hereunto set my hand.

CLARENCE LEON DELACHAUX.